(No Model.)

F. M. DEMAREST.
ALARM FOR BICYCLES AND OTHER VEHICLES.

No. 385,547. Patented July 3, 1888.

Witnesses
Geo. W. Breck
Carrie E. Ashley

Inventor.
Francis M. Demarest
By his Attorneys
Pope, Edgecomb & Terry.

UNITED STATES PATENT OFFICE.

FRANCIS M. DEMAREST, OF BROOKLYN, ASSIGNOR OF THREE-FOURTHS TO THOMAS GEREHART, ALLEN S. GOOKIN, AND E. F. J. GAYNOR, ALL OF NEW YORK, N. Y.

ALARM FOR BICYCLES AND OTHER VEHICLES.

SPECIFICATION forming part of Letters Patent No. 385,547, dated July 3, 1888.

Application filed March 16, 1887. Serial No. 231,095. (No model.)

*To all whom it may concern:*

Be it known that I, FRANCIS M. DEMAREST, a citizen of the United States, residing in Brooklyn, in the county of Kings and State of New York, have invented certain new and useful Improvements in Attachments for Bicycles and other Vehicles, of which the following is a specification.

The invention relates to the class of attachments for bicycles and other vehicles employed for giving signals and sounding alarms.

The object of the invention is to provide a convenient and efficient device which may be operated in a ready manner by the machine itself, and controlled by the rider or driver to give a whistle or a succession of whistles or similar sounds.

The invention consists, in general terms, in placing upon a suitable portion of the frame of a bicycle, tricycle, or other machine an attachment consisting, preferably, of a piston and piston-cylinder carrying or connected with a suitable whistle or equivalent alarm or signaling device. The cylinder opens at the proper point into the tube of the whistle, and the movements of the piston to and fro within the cylinder force the air through the whistle, thus giving the required sound. The piston is designed to be driven to and fro by the movement of the wheel of the bicycle, and for this purpose the piston-rod extends through the open end of the cylinder and is coupled to a crank-pin upon a friction-wheel, which may, at the will of the rider, be placed against the periphery of the main wheel of the machine. The pressure causes the friction-wheel to be revolved rapidly, thus driving the piston to and fro.

The invention involves certain details of construction, which will be hereinafter more particularly pointed out, and various modifications in the construction of the several parts and in the application of the whistle will be evident. The invention is applicable to other devices than bicycles, but will be described more particularly in its relation thereto.

Figure 1:
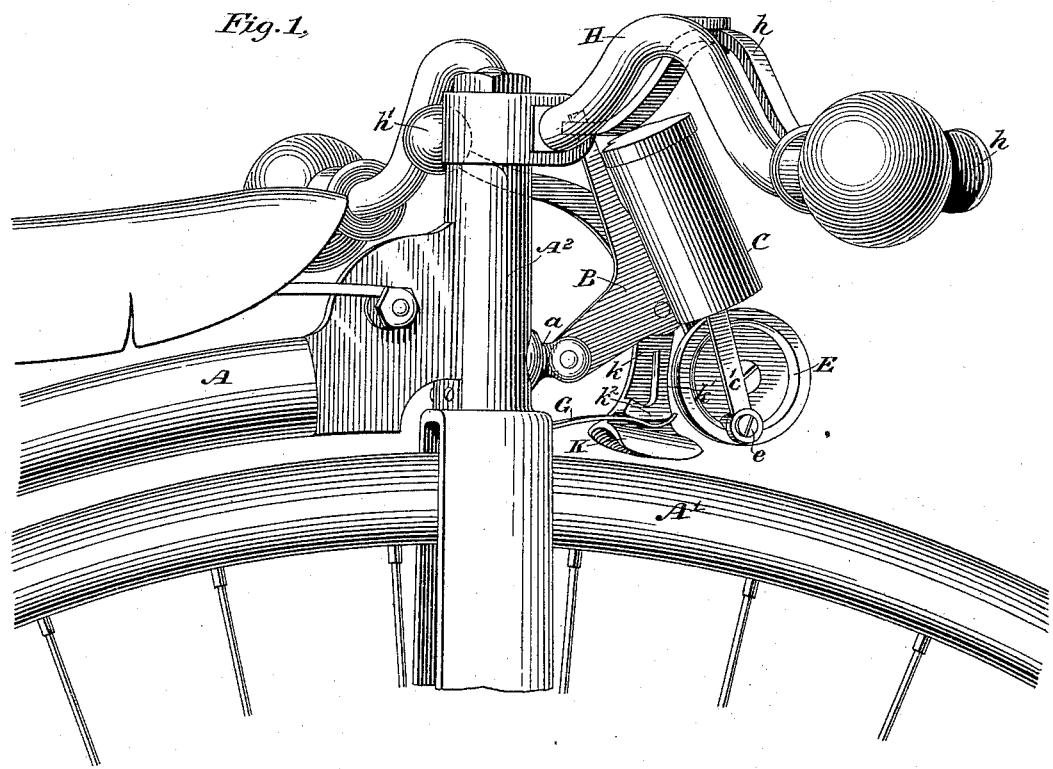
Figures 2, 3:
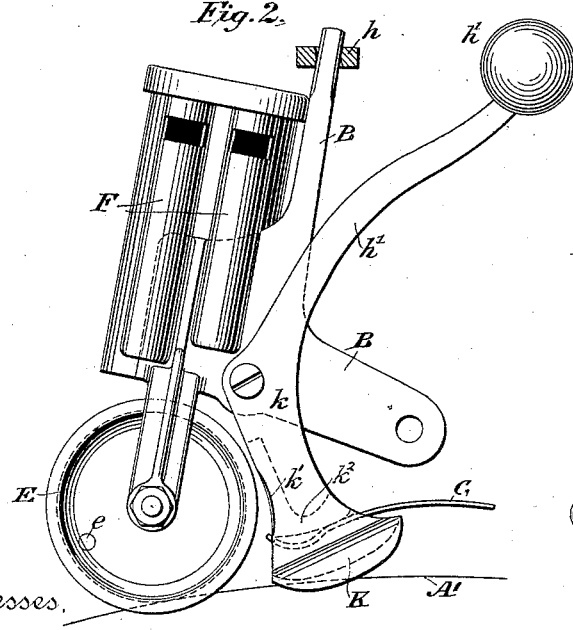

In the accompanying drawings, Figure 1 is a side view of a portion of a bicycle with the attachment applied thereto. Fig. 2 is a reverse view of the attachment. Fig. 3 is a cross-section showing certain details of construction.

Referring to the figures, A represents the backbone or perch of a bicycle, and $a$ represents the portion to which the brake-lever is usually pivoted. It is preferred, in the present instance, to substitute for the brake and its lever a special form of brake, which is attached to or forms a part of the whistle attachment. A support, B, for the attachment is pivoted to the lug $a$. This attachment consists of a piston-cylinder, C, in which there moves a piston, $c$. This piston $c$ is carried upon a piston-rod, $c'$, one end of which is pivoted to the piston, while the other end is pivoted to a pin or crank, $e$, projecting from the side of a friction-wheel, E. When the wheel E is revolved, the pin communicates its motion to the piston, causing it to be driven rapidly to and fro within the cylinder, thus alternately forcing air out of and drawing it into an opening, $f$. The piston may be of a suitable construction, adapted to move freely within the cylinder and at the same time preventing the air escaping past it. A convenient method of construction consists in forming it in two parts, $c^2$ $c^3$, fastened together by a screw, $c^4$. Between these two parts there is placed a leather, rubber, or other suitable washer. This may be replaced when it is worn.

Upon the side of the cylinder there is supported a duplex or other suitable whistle, F. The opening $f$ communicates with this whistle at the points corresponding with the openings which are usually provided for blowing into such whistles. When, therefore, the air is forced from the cylinder by the inward movement of the piston, it escapes through the opening $f$ and operates the whistle. The repeated pulsations of air thus occasioned give an almost continuous noise when the piston is driven rapidly. The whistle may be so constructed as to give a sound when the piston is drawn backward as well as when it is driven forward.

The frame B, carrying the cylinder and whistles, is, as already stated, pivoted to the lug

*a* upon the head A², and it is normally held by means of a spring, G, in such position that the wheel E is out of contact with the wheel A' of the machine. A handle or lever, *h*, extending into convenient proximity to the handle H of the machine, is employed for forcing the wheel E against the tension of the spring when it is desired to operate the whistle. The wheel is preferably provided with a grooved periphery fitting over the rounded rubber tire of the machine, and the extent of contact thus given will secure the required amount of friction.

The pressure with which the wheel E is applied may be regulated by the pressure exerted upon the handle *h*.

The device described is, as already stated, preferably applied at the point where the brake is usually applied to a bicycle, the brake itself being replaced by a modified form carried upon the frame B. This is applied to the wheel when desired by means of the lever *h*, the latter serving then as a brake-lever. As it may be desired, however, to apply the whistle without applying the brake, it is necessary that the brake be normally held in such position that it will not strike the wheel when the whistle is applied. For this reason the brake K is carried upon a lever, *k*, pivoted to the frame B. A spring, G, pressing against one side or the other of a shoulder, *k*², upon the lever *k*, holds the latter in either of two positions in which it may be placed by means of a handle or lever, *h'*, which is placed in any convenient position with reference to the handle *h*. When the handle *h'* is moved in one direction, the lever *k* is moved toward the wheel E, thus causing the brake to be in position to strike against the wheel A' when the lever is operated. This will serve to apply the brake to the wheel in the usual manner. If, however, the handle *h'* is thrown in the opposite direction, the brake will not strike the wheel, even though the handle *h* be operated as before.

As it is usually desirable that the whistle should not be operated each time the brake is applied, a device may with advantage be employed for preventing the wheel E from revolving when the brake is applied. This may be accomplished, for instance, by placing upon the lever *k* a brake-surface, *k'*, for the wheel E. When, therefore, the brake is applied, this brake-surface *k'*, bearing against the wheel E, prevents it from revolving. An incidental result secured is the application of additional brake-surface by reason of the wheel E, which is thus prevented from revolving.

It is evident that single and triple whistles may be employed in place of whistle F, and that the form of this whistle may be variously modified, and that other wind-instruments may be substituted therefor without departing from the spirit of the invention; and, moreover, there may be various modifications in the method of securing desired movements of the piston.

I claim as my invention—

1. The combination, with the wheel of a bicycle or other vehicle and its head, of a whistle carried thereby, a piston, a piston-cylinder opening near one end into the whistle and opening directly to the air at the other end, a friction-wheel applied to the said wheel, a piston-rod pivoted to said piston and leading loosely through the open end of the cylinder to said friction-wheel for forcing air directly through the whistle by the revolution of the friction-wheel.

2. The combination, with a revolving wheel and a frame supported thereby, of a support pivoted to said frame, a piston, a rigidly-mounted piston-cylinder upon said support, a pneumatic signaling device opening into said cylinder, a friction-wheel connected with said piston for driving the same within the cylinder, and means for applying the friction-wheel to the first-named wheel at will.

3. The combination, with a bicycle-wheel and its frame, of a support pivoted thereto, a pneumatic signaling device rigidly secured to said support, a friction-wheel for operating said device, means for applying the same to the bicycle-wheel at will, and a brake for the wheel, also carried upon said pivoted support.

4. The combination, with a bicycle, of a support pivoted to the frame thereof, a piston and cylinder carried upon said support, a whistle or equivalent device operated by the movement of the piston within the cylinder, a friction-wheel coupled with the piston, means for applying it to a wheel of the bicycle, a brake for the bicycle, pivoted to the support carrying the cylinder, a brake for the friction-wheel, and means for applying the first-named brake to the main wheel of the bicycle and simultaneously applying the other brake to the friction-wheel.

5. A signaling attachment for bicycles, tricycles, and similar vehicles, consisting of a piston, a piston-cylinder entirely open to the air at one end, a piston-rod extending freely through said open end, a friction-wheel with which said rod is coupled for operating said piston from a wheel of the bicycle, and a whistle attached to the side of the cylinder and opening directly into the cylinder.

6. A signaling attachment for vehicles, consisting of a whistle or other pneumatic device, a piston attached thereto for forcing air into the whistle, a brake carried by the support of the whistle for normally preventing the operation of said piston, a lever for operating said brake, a brake connected therewith for the vehicle, and a lever for applying the last-named brake to a wheel of the vehicle.

7. The combination, with a bicycle or other vehicle, of the pivoted support, the pneumatic device consisting of the cylinder and the piston driven to and fro therein, the signaling device operated thereby, the wheel E, attached to and driving the piston, a lever for placing the wheel E against a wheel of the vehicle, a brake, K, for the wheel, a lever for controlling the position of the brake K with reference to the wheel E, and means for retaining said brake in one or the other of two positions with reference to said wheel.

In testimony whereof I have hereunto subscribed my name this 15th day of March, A. D. 1887.

FRANCIS M. DEMAREST.

Witnesses:
CHARLES A. TERRY,
DANL. W. EDGECOMB.